Figure 1:
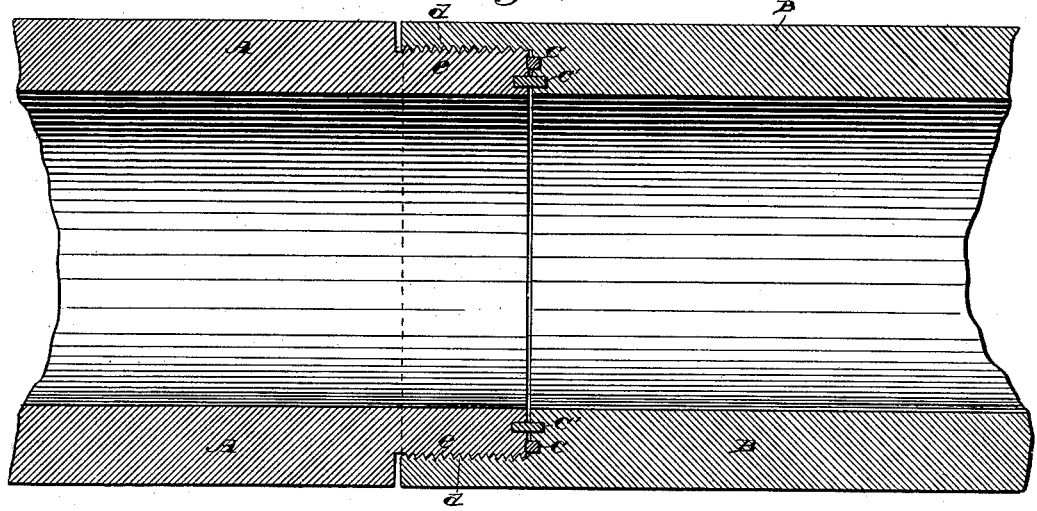

(No Model.)

A. H. EMERY.
PIPE COUPLING.

No. 279,087. Patented June 5, 1883.

Attest
Wm. J. Danner
Wm. F. Sayers

Inventor
A H Emery
By Knight Bros
Atty's

N. PETERS, Photo-Lithographer, Washington, D. C.

UNITED STATES PATENT OFFICE.

ALBERT H. EMERY, OF NEW YORK, N. Y.

PIPE-COUPLING.

SPECIFICATION forming part of Letters Patent No. 279,087, dated June 5, 1883.

Application filed June 22, 1882. (No model.)

To all whom it may concern:

Be it known that I, ALBERT H. EMERY, a citizen of the United States, residing at New York, in the State of New York, have invented certain new and useful Improvements in Pipe-Couplings, of which the following is a specification.

My joint or coupling is adapted for pipes of large caliber employed for conveying liquid under heavy pressure.

My invention consists, essentially, in the provision of an annular packing or packings of soft metal placed within a recess or recesses in the parallel abutting faces of one or both members or sections of the pipe to be coupled, which annular soft-metal packing is compressed by forcing the two pipe-sections together by any preferred form of screw-coupling or other suitable means. Before the ends are pressed together the annular packing is inserted in the recess in one member and projects from the face thereof, so as to bear against the other member, or to enter a similar annular recess therein, as the case may be. The two members are then pressed together with great force by means of an external thread formed on one member and an internal thread on the other member, as shown in the drawings, or by any other suitable means, the ductility of the soft metal which is confined within the annular seat or seats causing it to adapt itself to the pressure and to flow or pass around the annular recess or recesses in which it is contained, as may be necessary to equalize the pressure on all parts of the joint, rendering all parts thereof perfectly tight and maintaining this tight closure, while the pipe may be deflected more or less out of a straight line.

In order that the invention may be more fully understood, I will proceed to describe it with reference to the accompanying drawings, in which—

Figure 2:
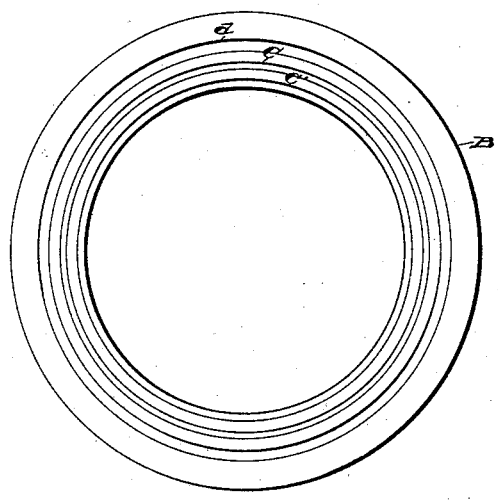

Figure 1 is a longitudinal section of a pipe-joint illustrating my invention. Fig. 2 is an end elevation of one member of the joint, showing the soft-metal sealing-rings in position.

A and B represent the two ends or sections of pipe to be coupled together. As shown in Fig. 1, the section A is formed with external screw-threads, $e$, to engage with corresponding screw-threads, $d$, formed on the interior of the section B.

C C' represent cylindrical or annular washers, formed of lead or other soft or ductile metal, inserted in annular seats or recesses in the end of the pipe-section B, and projecting beyond the face thereof, so as to bear against the parallel face of the pipe-section A, as shown at C, or to enter a recess therein, as shown in the case of the packing C'. Any desirable number of either or both forms of the packing-rings above described may be used in either or both of the pipe ends in forming a single joint. Where more than one is used it is necessary that the requisite quantity of metal be placed in each groove, so that an equal pressure shall be applied to all the sealing-rings.

The length of the annular sealing-ring is so proportioned to the depth of its seat or recess that when the packing is fully compressed little or no space will remain between the parallel faces of the pipe ends, so that there may be no danger of the ductile metal squeezing out under the heavy pressure applied in putting the sections together, or by the contained liquid, or by the deflection of the pipe.

In cases where the pressure is too heavy to be resisted by lead, copper may be used, or any suitable alloy either more or less compressible than copper, as the case may require. Where very heavy pressure is to be resisted bronze or soft steel will be a suitable material for the packing.

Any deflection which can be sustained by the pipe-sections, jointed and coupled together, as above described, will cause the ductile packing to be squeezed away from that portion where the greatest pressure is sustained and to flow around in the annular recess, slightly increasing its thickness at other parts, thus equalizing the pressure and maintaining a tight joint at all points.

My invention will thus be seen to differ essentially from the common mode of forming joints between the ends of pipes by the use of washers, of flat or other shape, simply interposed between said pipe ends.

Having thus described my invention, the following is what I claim as new therein, and desire to secure by Letters Patent:

The combination of two pipe ends having parallel abutting faces, with interposed metallic packing inclosed in a recess, substantially as and for the purpose set forth.

ALBERT H. EMERY.

Witnesses:
OCTAVIUS KNIGHT,
L. M. HOPKINS.